Aug. 14, 1945.    M. A. OLGIATI    2,382,657
BREAD MAKING MACHINE
Filed Oct. 7, 1942    5 Sheets-Sheet 1

INVENTOR.
Mario A. Olgiati
BY
Edward M. Apple
ATT'Y.

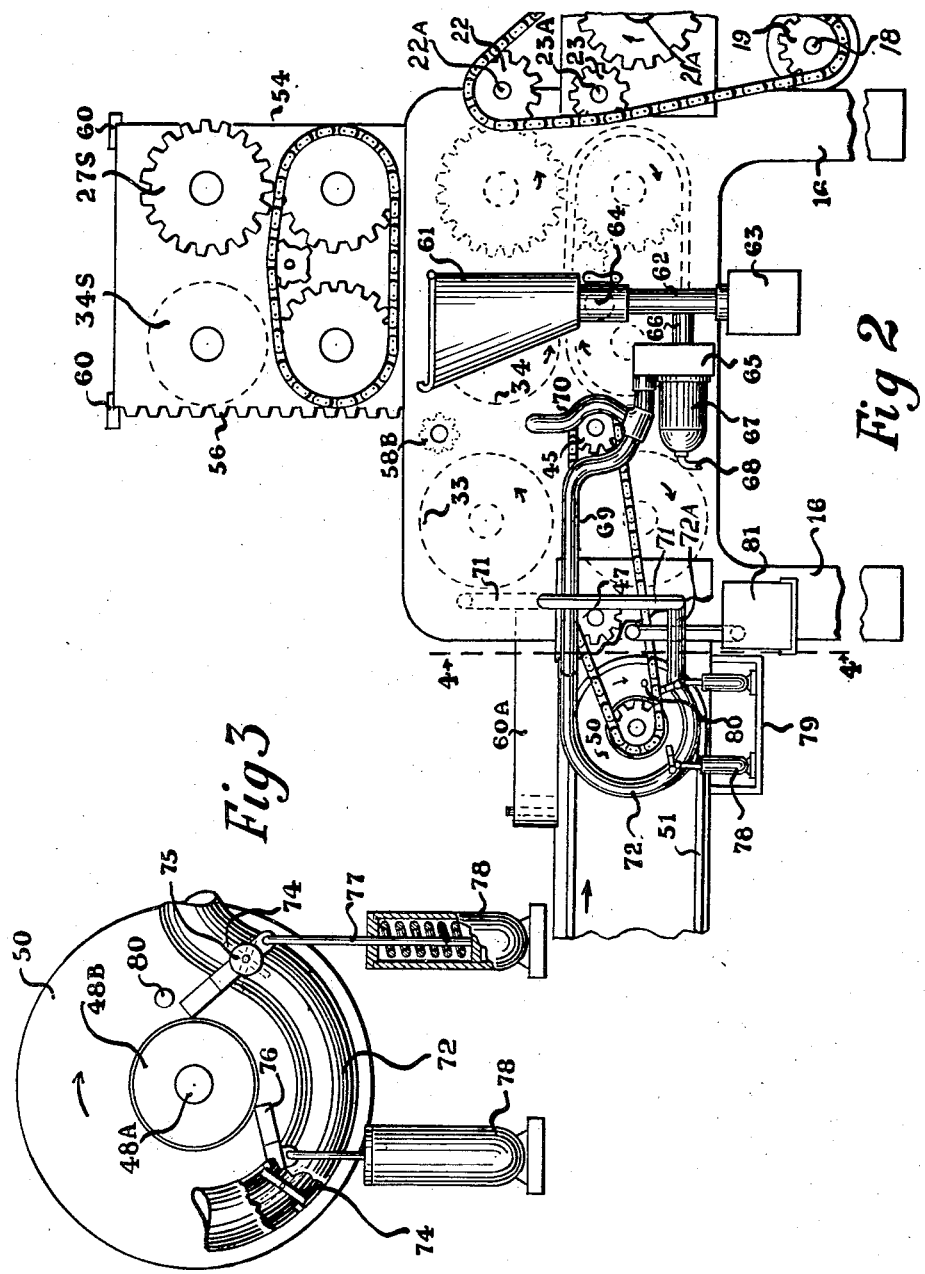

Aug. 14, 1945.　　　M. A. OLGIATI　　　2,382,657
BREAD MAKING MACHINE
Filed Oct. 7, 1942　　　5 Sheets-Sheet 4

Mario A. Olgiati INVENTOR.
BY Edward M. Apple
ATTY

Aug. 14, 1945.    M. A. OLGIATI    2,382,657
BREAD MAKING MACHINE
Filed Oct. 7, 1942    5 Sheets-Sheet 5

INVENTOR.
Mario A. Olgiati
BY Edward M. Apple
ATT'Y.

Patented Aug. 14, 1945

2,382,657

UNITED STATES PATENT OFFICE 2,382,657

BREADMAKING MACHINE

Mario A. Olgiati, Detroit, Mich.

Application October 7, 1942, Serial No. 461,112

7 Claims. (Cl. 107—9)

This invention relates to the art of preparing bread dough and has particular reference to a machine for automatically measuring and forming the dough into loaves of various sizes, such as disclosed in Patent Number 2,276,545, dated March 17, 1942.

The invention resides in improvements to that machine and one of the objects of the invention is to provide an automatic dusting mechanism intended to keep all parts of the machine, with which the dough comes in contact, dusted with flour or other dusting medium to the end that the dough will not stick or cling to the machine while it is being formed into loaves.

Another object of the invention is the provision of a dusting device of the character referred to, which is automatic in operation and which is provided with means to cause intermittent functioning of certain of its parts.

A further object of the invention is the provision of a loaf forming machine which is provided with means to automatically control the feeding mechanism in the event of an overload.

A further object of the invention is the provision of a loaf forming machine which is constructed and arranged in such manner that the change over from certain types of forming and cutting rolls to other types may be easily effected.

Another object of the invention is the provision of a device of the character referred to which is constructed and arranged so that certain rollers may be moved into and out of dusting position.

The foregoing and other objects and advantages of the invention will become more apparent as the description proceeds, reference being made from time to time to the accompanying drawings in which:

Fig. 2 is a side elevation of the machine illustrated in Fig. 1.

Fig. 3 is a view taken substantially on the line 3—3 of Fig. 1. This view shows parts broken away and other parts in section to illustrate the principles involved.

Referring now more particularly to the drawings it will be understood that in the embodiment herein disclosed my improved machine consists of frame members 10, 11, 12, 13, 14, and 15 which are secured together by any suitable means such as welding or the like. The members 11 to 14 (Fig. 4) are tied together by means of a bed plate 11A. The members 10 to 15 inclusive, comprising the frame of the machine are supported by legs 16, and other legs not shown. The working parts of the machine are supported by the framework as hereinafter described.

The working parts of the machine, for the sake of clarity, may be divided into the following general mechanisms, namely; driving mechanism, the feeding mechanism, the dusting mechanism, and the forming mechanism.

The driving mechanism will include the motor or motors, gears, chains, rollers, belts and the like through which motive power is transmitted.

The feeding mechanism will include the several conveyer belts, rollers, and the like which are employed to advance the movement of the dough into and out of the machine.

The dusting mechanism will include all of the elements utilized in storing and transporting the flour or other dusting medium to the various working parts of the machine.

The forming mechanism will include the several pairs of rollers used for flattening, cutting, and forming the dough into loaves.

The motive power of the driving mechanism stems from the primary motor 17 which is supported by any suitable means to one of the legs 16 of the framework.

Figure 6:
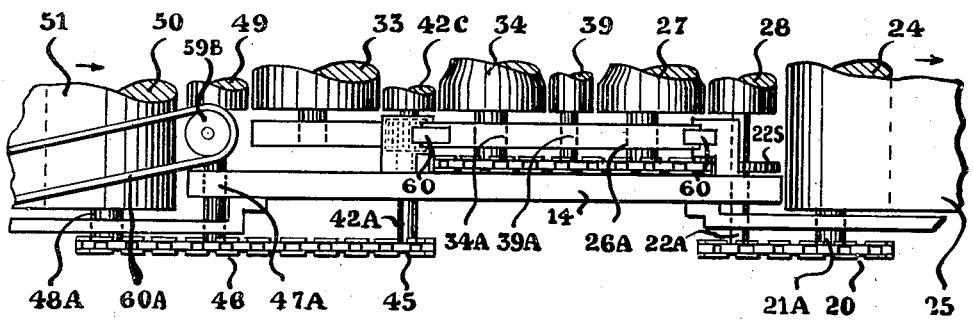
Fig. 6 is a fragmentary top plan view of the right side of the machine as illustrated in Fig. 5.
Figure 5:
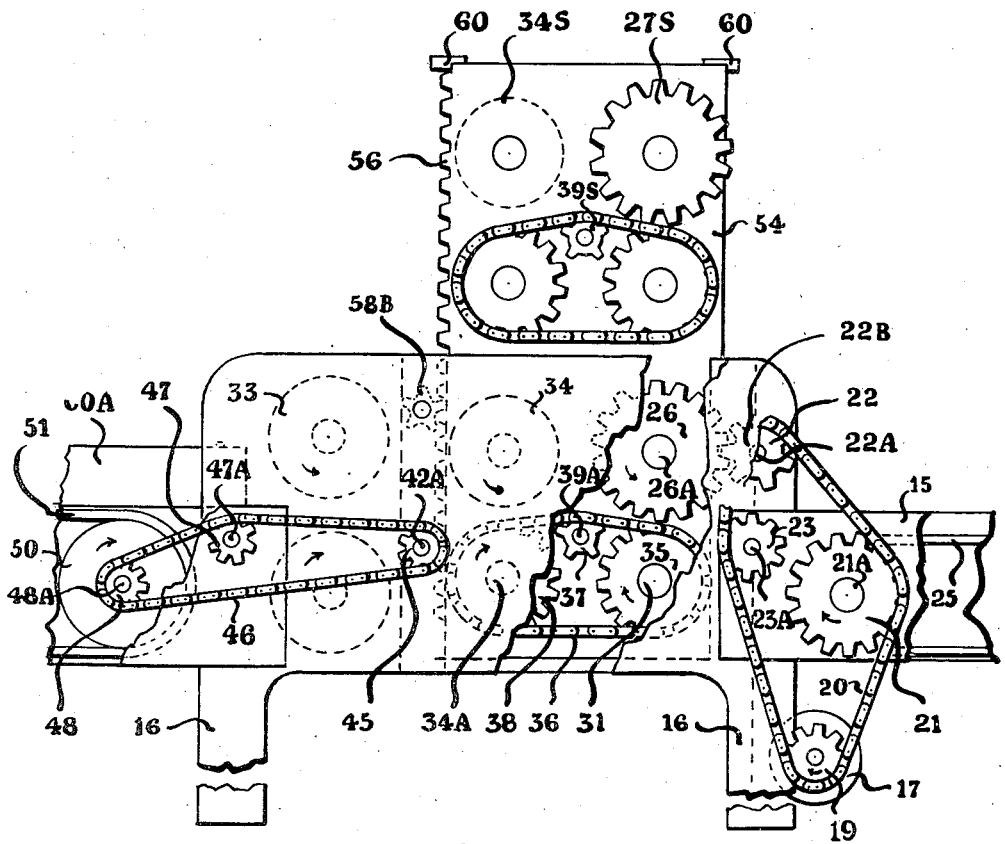
Fig. 5 is a view showing the right side of the machine illustrated in Fig. 1 with the dusting mechanism removed and other parts broken away to illustrate the relation of certain parts.

The motive power is transmitted from the motor 17 to the various working parts through chains and gear trains more particularly described as follows:

The motor 17 (Figs. 2, 5, 6) is provided with a shaft 18 to which is secured a sprocket 19, over which passes the chain 20, which in turn drives the sprockets 21, 22, and 23. The sprocket 21 is secured to the shaft 21A which supports and drives the roller 24 (Fig. 6), which in turn carries the belt 25, which conveys the dough from the machine after it has been formed as hereinafter described.

The sprocket 22, drives the shaft 22A (Figs. 5 and 6) to which is secured the pinion 22B which meshes with the gear 26, the latter being secured to the shaft 26A which in turn supports one of the forming rolls 27.

The sprocket 23 is secured to the shaft 23A which carries the small roll 28 the latter serving as a filler roll to convey the dough from the forming roll 27 to the conveyor belt 25.

Figure 8:
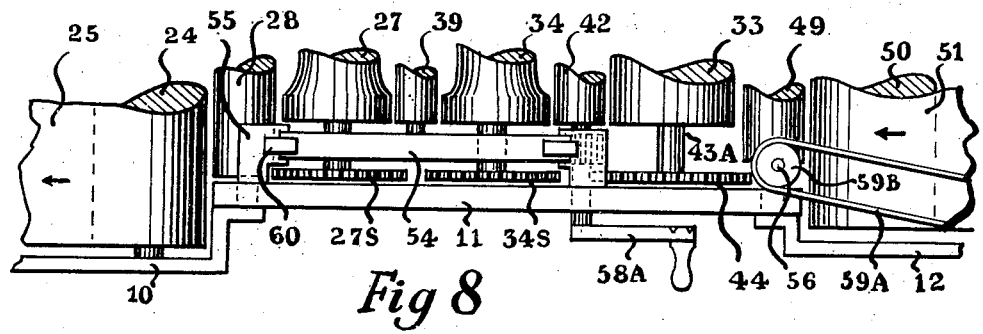
Fig. 8 is a fragmentary top plan view of the left side of the machine as illustrated in Fig. 7.
Figure 7:
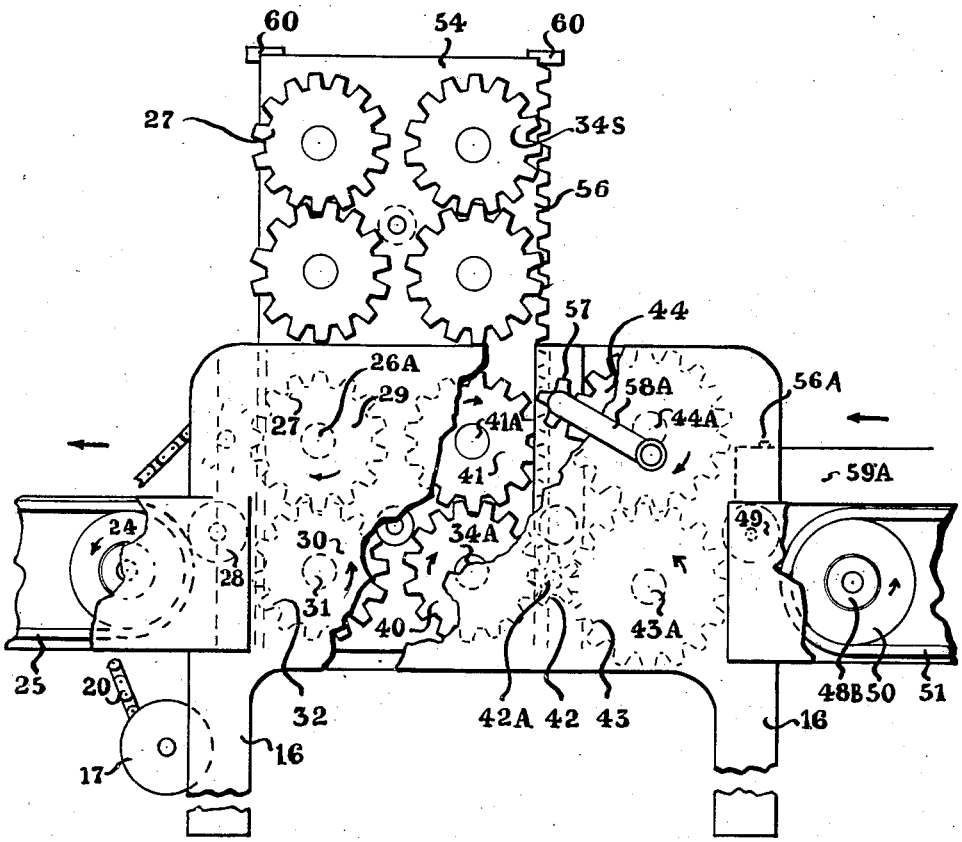
Fig. 7 is a view showing the left side of the machine illustrated in Fig. 1 with the dusting mechanism removed and other parts broken away to illustrate the relation of certain parts.

The shaft 26A, at the end opposite the gear 26, carries a gear 29 (Figs. 7 and 8) which in turn meshes with a gear 30 carried on the shaft 31 which supports the roll 32 which is immediately below the roll 27. The rolls 27 and 32 are counter parts and make up one of the pairs of forming rolls. The other pairs consist of the flattening rolls 33 (Fig. 1), and the cutting rolls 34. Power is transmitted from the shaft 31 to the sprocket 35 (Fig. 5), and through the chain 36 to the sprockets 37 and 38, which are respectively mounted on the shafts 39A and 34A which support the filler roll 39 (Fig. 6) and the lower roll of the pair of rolls 34. On the shaft 34A (Fig. 7), at the end opposite the chain 36, is a gear 40 which meshes with a gear 41 carried on the shaft 41A which in turn supports the upper roll of the pair 34.

A pinion 42 (Fig. 7) carried on a shaft 42A meshes with the gear 40 and with the gear 43 which is secured to the shaft 43A which in turn supports the lower roll of the pair 33. The gear 43 also meshes with the gear 44 which drives the shaft 44A which in turn supports the upper roll of the pair 33. The shaft 42A supports the filler roll 42C.

The shaft 42A (Fig. 5), at the end opposite the pinion 42 carries a sprocket 45, which drives a chain 46, which in turn drives sprockets 47 and 48. The sprocket 47 being secured to the shaft 47A, which supports the filler roll 49, and the sprocket 48 being secured to the shaft 48A supporting the roll 50, which supports one end of the conveyor belt 51, which carries the dough into the machine.

Figure 1:
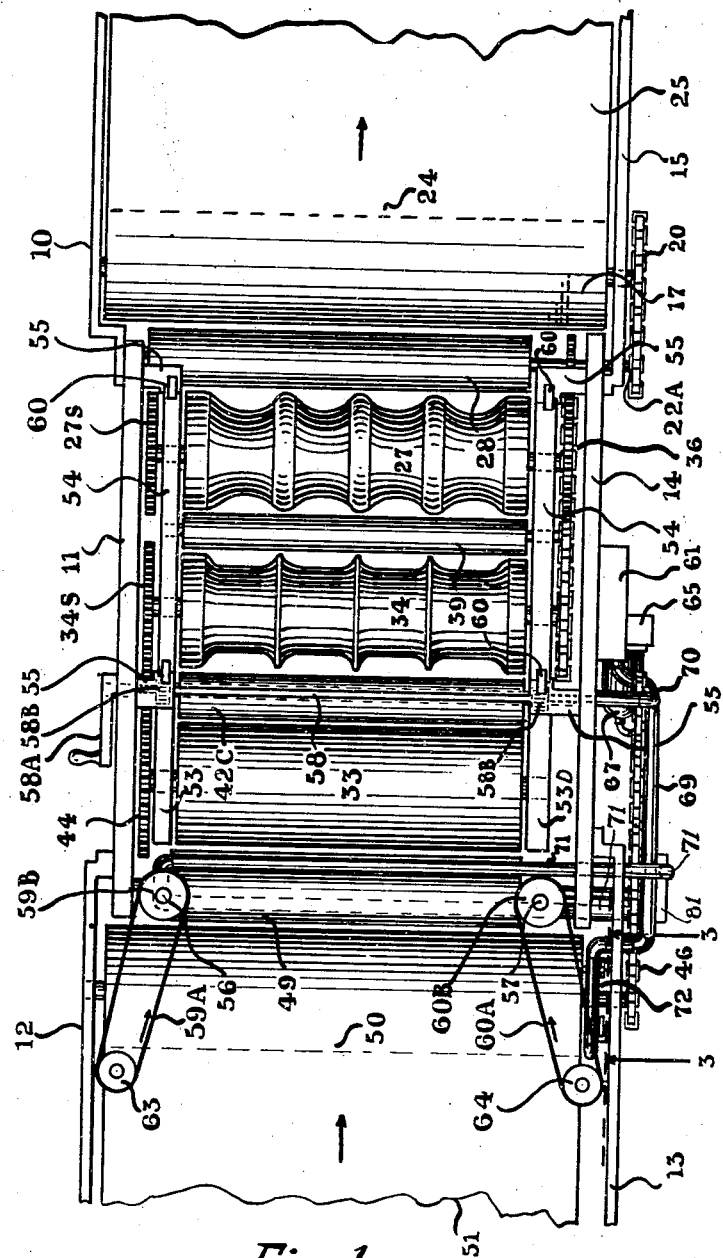
Fig. 1 is a fragmentary top plan view of a machine involving my invention.

The shaft 47A (Fig. 4) carries gears 52 and 53 which mesh with gears 54C and 54D carried on the lower ends of the spindles 56 and 57, the latter being journaled in suitable brackets (not shown) secured to the side members 11 and 14. The spindles 56 and 57 carry pulleys 59B and 60B over which the belts 59A and 60A are adapted to run. The belts are supported at their opposite ends by similar pulleys 63 and 64 (Fig. 1).

The belts 59A and 60A are adapted to cooperate with the belt 51 to convey the dough into the machine. It will be noted that the belts 59A and 60A are inwardly inclined and travel in the directions indicated by the directional arrows.

The shaft 48A has an enlarged central section Fig. 3 which is adapted to support the roll 50 in frictional engagement so that in the event of an overload on the belt 51 the roll 50 will stop and the in movement of the dough will be halted until the overload is corrected.

The rolls 33 are intended to flatten the dough which enters the machine in large lumps or rolls. The rolls 34 cut it into continuous strips and the rolls 27 form the strips into predetermined shapes ready to be cut into loaves by a subsequent operation not disclosed in this application.

The axles supporting the rolls are preferably journaled in oilless bearings. The axles supporting the rolls 33 and 42C are journaled in members 53 (Fig. 1) which are fixed to the frame members 11 and 14.

The axle 22A supporting the roll 28 is journaled in the members 11 and 14.

The axles supporting the rolls 27, 34, and 39 and their counter parts are journaled in shiftable members 54 which are adapted to slide vertically in channel members 55, which are secured by any suitable means to the side members 11 and 14. The members 54 are provided with racks 56 (Figs. 2 and 5) which engage pinions 58B carried on the shaft 58, which is rotated by the crank 58A, so that the members 54 may be raised and lowered.

Substitute pairs of rolls 27S, 34S and substitute roll 39S (Figs. 5 and 7) are journaled in the members 54, above the respective rolls 27, 34 and 39. These rolls are intended to have different shapes and configurations so that different size and shaped loaves can be formed. These rolls can be lowered into the positions assumed by the rolls 27, 34, and 39 and when so lowered will function and operate in exactly the same manner as hereinabove described with reference to rolls 27, 34 and 39. When the rolls 27S, 34S, and 39S are so lowered the rolls 27, 34, and 39 are also lowered to an out of operation position below the frame. Stops 60 on the members 54 limit their movement.

The inner sides of the members 11D, and 14 are polished and present smooth surfaces so that the dough will not easily cling to them, particularly after being dusted as hereinafter described.

Figure 4:
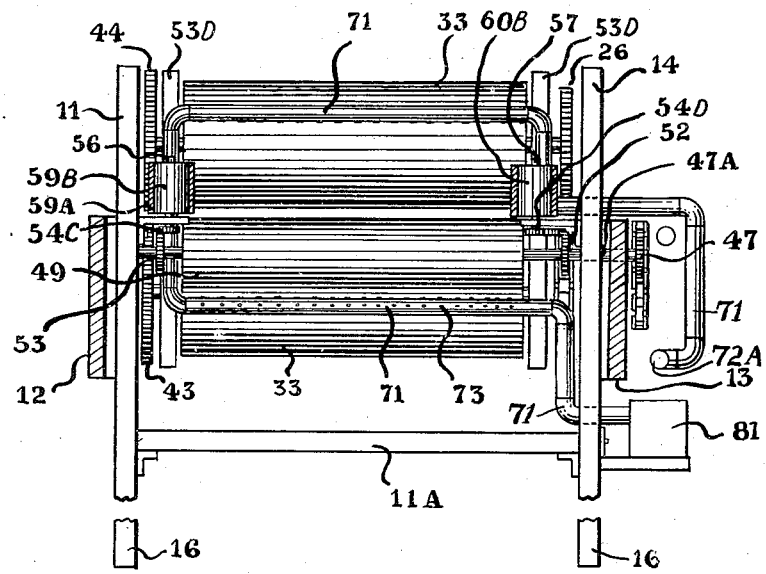
Fig. 4 is a view taken substantially on the line 4—4 of Fig. 2.

The dusting mechanism (Figs. 1, 2, 3, and 4) consists of a receptacle 61, in which flour or other dusting powder may be carried. A pipe 62 depends from the receptacle 61 and communicates with a second receptacle 63, in which the flour is caught after it passes through the screen or sifter 64. A blower 65 communicates through its suction side as at 66, with the pipe 62 and picks up flour from the receptacles 61 and 63 and distributes it to the several working parts as hereinafter described. The blower 65 is driven by an electric motor 67, which gets its power through the connection 68, which may or may not be in the same circuit as the prime motor 17. The flour or other dusting powder is distributed from the blower 65 through the conduits 69, 70, 71, and 72 to the several parts needing dusting. The conduit 70 extends longitudinally between the rolls 33 and 34 and is arranged to deposit flour on the faces of the rolls. It returns into the receptacle 61 (Figs. 1 and 4). The conduit 71 connects to the pipe 72 as at 72A, Fig. 4, and extends upwardly and inwardly through 14, thence upwardly adjacent to the belt 60A, then along the front surface of the upper roll 33, and is adapted to deposit flour on top of the dough as it passes over the roll 49. On its return the conduit 71 passes the belt 59A and then extends along the outside of the belt 51 as the latter passes over the roll 50. The dusting is effected through apertures, as at 73, positioned in the conduit 71, wherever dusting is desired. The conduit 71 after passing along the roll 50 extends downwardly and communicates with the interior of the receptacle 61. One of the features of this invention resides in the means which I employ to automatically control the dusting of certain parts of the machine. In Figs. 2 and 3, I show these means, which consist of valves 74 positioned in the conduit 72. The valves 74 are pivoted as at 75, and are provided with triggers 76, and are normally held closed by the spring actuated plungers 77 of the dash pots 78, which are mounted on the bracket 79. A pin 80 is carried at one end of the roll 50 and is arranged to contact the triggers 76 and keep the valves 74 open as long as the roll 50 is rotating, thus assuring the dusting of the parts served by the conduit 71. If the roll 50 is stopped the valves 74 are held closed and no flour or powder is permitted to escape through the conduit 71. Surplus flour is caught in the receptacle 81.

Having described my invention, what I claim and desire to secure by Letters Patent is:

1. In a dough handling machine of the character described including feeding means, means to drive the said feeding means, and flour dusting means, the combination of means associated with said flour dusting means and controlled by said driving means for effecting the intermittent distribution of flour to parts of said feeding means, the said means associated with said flour dusting means comprising distribution pipes valves positioned in the said distribution pipes, dash pots, for normally holding said valves closed, and valve lever arms which are actuated by a member comprising part of the feeding means, to hold said valves open.

2. In a machine of the character described including a plurality of rollers, the combination of means for feeding dough to said rollers, said means including a horizontally positioned conveyor belt and two angularly positioned auxilliary belts, means for driving said rollers and said belts, and means for stopping said belts in the event of an over load on said conveyor belt.

3. The combination defined in claim 2, including means for dusting certain of said rollers and said belts, and means for interrupting the dusting of said belts in the event of the stopping of said belts.

4. In a device of the character described including driving and feeding means, the combination of a plurality of forming rolls journaled in predetermined relation in a pair of vertically slidable end members, racks on said slidable end members, a rotatable shaft, and pinions on said shaft arranged, when rotated, to move said end members, and to move said forming rolls into and out of operating position with respect to said driving and feeding means.

5. In a device of the character described, including an infeeding belt, and a dusting mechanism, for said belt, the combination of a roller for driving said belt, and means operated by said roller for rendering inactive the said dusting mechanism.

6. The combination defined in claim 4, including a dusting mechanism, in which said vertically slidable end members are arranged to move said forming rolls into and out of operating relation with respect to said dust mechanism.

7. The combination defined in claim 4, in which said slidable end members, have means for locating and locking said forming rolls in predetermined relation to the said driving and feeding means.

MARIO A. OLGIATI.